United States Patent
McCoy

(10) Patent No.: US 9,665,838 B2
(45) Date of Patent: May 30, 2017

(54) MESSAGING ARCHITECTURE AND SYSTEM FOR ELECTRONIC MANAGEMENT OF RESOURCES

(75) Inventor: Richard A. McCoy, Stevensville, MI (US)

(73) Assignee: Whirlpool Corporation, Benton Harbor, MI (US)

(*) Notice: Subject to any disclaimer, the term of this patent is extended or adjusted under 35 U.S.C. 154(b) by 1627 days.

(21) Appl. No.: 12/326,999

(22) Filed: Dec. 3, 2008

(65) Prior Publication Data
US 2010/0138470 A1    Jun. 3, 2010

(51) Int. Cl.
*G06F 15/16*    (2006.01)
*G06Q 10/06*    (2012.01)

(52) U.S. Cl.
CPC .................. *G06Q 10/06* (2013.01)

(58) Field of Classification Search
CPC ..................................... G06Q 10/06
USPC ........................................ 709/217
See application file for complete search history.

(56) References Cited

U.S. PATENT DOCUMENTS

| | | |
|---|---|---|
| 3,925,680 A | 12/1975 | Dixon |
| 4,090,088 A | 5/1978 | McMahon et al. |
| 4,168,491 A | 9/1979 | Phillips et al. |
| 4,247,786 A | 1/1981 | Hedges |
| 4,293,915 A | 10/1981 | Carpenter et al. |
| 4,336,462 A | 6/1982 | Hedges et al. |
| 4,472,640 A | 9/1984 | Elmer |
| 4,476,398 A | 10/1984 | Hallam |
| 4,612,619 A | 9/1986 | Culp |
| 4,771,185 A | 9/1988 | Feron et al. |
| 4,819,180 A | 4/1989 | Hedman et al. |
| 4,829,159 A | 5/1989 | Braun et al. |
| 4,847,781 A | 7/1989 | Brown, III et al. |
| 4,847,782 A | 7/1989 | Brown, Jr. et al. |
| 4,998,024 A | 3/1991 | Kirk et al. |
| 5,017,799 A | 5/1991 | Fishman |
| 5,168,170 A | 12/1992 | Hartig |
| 5,272,585 A | 12/1993 | Gibbs |
| 5,359,540 A | 10/1994 | Ortiz |
| 5,424,903 A | 6/1995 | Schreiber |
| 5,436,510 A | 7/1995 | Gilbert |
| 5,481,140 A | 1/1996 | Maruyama et al. |

(Continued)

FOREIGN PATENT DOCUMENTS

| | | |
|---|---|---|
| DE | 195 41 869 C1 | 1/1997 |
| DE | 19824168 A1 | 12/1999 |

(Continued)

OTHER PUBLICATIONS

Matsukawa, Isamu; Asano, Hiroshi; Kakimoto, Hitoshi; Household Response to Incentive Payments for Load Shifting: A Japanese Time-of-Day Electricity Pricing Experiment; Energy Journal, 21, 1, 73; Jan. 2000; ISSN: 0195-6574.

(Continued)

*Primary Examiner* — Liangche A Wang
*Assistant Examiner* — Sherman Lin

(57) ABSTRACT

A system for managing resources used by an appliance includes a messaging architecture that uses resource profiles and function identifiers that represent a meaningful context related to the resource profiles so that the production or consumption of a resource can be managed by electronic messages using the message architecture.

30 Claims, 9 Drawing Sheets

(56) References Cited

U.S. PATENT DOCUMENTS

| | | | |
|---|---|---|---|
| 5,483,656 A | 1/1996 | Oprescu et al. | |
| 5,502,339 A | 3/1996 | Hartig | |
| 5,506,790 A | 4/1996 | Nguyen | |
| 5,543,667 A | 8/1996 | Shavit et al. | |
| 5,544,036 A * | 8/1996 | Brown et al. | 340/825.24 |
| 5,572,438 A | 11/1996 | Ehlers et al. | |
| 5,579,201 A | 11/1996 | Karageozian | |
| 5,581,132 A | 12/1996 | Chadwick | |
| 5,659,601 A | 8/1997 | Cheslog | |
| 5,754,445 A | 5/1998 | Jouper et al. | |
| 5,761,083 A | 6/1998 | Brown, Jr. et al. | |
| 5,831,345 A | 11/1998 | Michaud | |
| 5,844,326 A | 12/1998 | Proctor et al. | |
| 5,880,677 A | 3/1999 | Lestician | |
| 6,018,690 A | 1/2000 | Saito et al. | |
| 6,018,726 A | 1/2000 | Tsumura | |
| 6,028,977 A | 2/2000 | Newsome | |
| 6,111,762 A | 8/2000 | Igarashi et al. | |
| 6,150,955 A | 11/2000 | Tracy et al. | |
| 6,169,964 B1 | 1/2001 | Aisa et al. | |
| 6,177,739 B1 | 1/2001 | Matsudaira et al. | |
| 6,181,985 B1 | 1/2001 | O'Donnell et al. | |
| 6,195,018 B1 | 2/2001 | Ragle et al. | |
| 6,216,956 B1 | 4/2001 | Ehlers et al. | |
| 6,301,674 B1 | 10/2001 | Saito et al. | |
| 6,329,616 B1 | 12/2001 | Lee | |
| 6,369,643 B1 | 4/2002 | Lee et al. | |
| 6,487,509 B1 | 11/2002 | Aisa | |
| 6,493,643 B1 | 12/2002 | Aisa | |
| 6,519,509 B1 | 2/2003 | Nierlich et al. | |
| 6,583,521 B1 | 6/2003 | Lagod et al. | |
| 6,590,304 B1 | 7/2003 | Manning et al. | |
| 6,621,179 B1 | 9/2003 | Howard | |
| 6,624,532 B1 | 9/2003 | Davidow et al. | |
| 6,631,622 B1 | 10/2003 | Ghent et al. | |
| 6,633,823 B2 | 10/2003 | Bartone et al. | |
| 6,681,154 B2 | 1/2004 | Nierlich et al. | |
| 6,718,214 B1 | 4/2004 | Schoettle et al. | |
| 6,741,442 B1 | 5/2004 | McNally et al. | |
| 6,745,106 B2 | 6/2004 | Howard et al. | |
| 6,751,562 B1 | 6/2004 | Blackett et al. | |
| 6,795,707 B2 | 9/2004 | Martin et al. | |
| 6,839,717 B1 | 1/2005 | Motoyama et al. | |
| 6,861,621 B2 | 3/2005 | Ghent | |
| 6,891,478 B2 | 5/2005 | Gardner | |
| 6,904,385 B1 | 6/2005 | Budike, Jr. | |
| 6,931,003 B2 | 8/2005 | Anderson | |
| 6,940,272 B2 | 9/2005 | Niv | |
| 6,961,642 B2 | 11/2005 | Horst | |
| 6,988,375 B2 | 1/2006 | Bashark | |
| 7,034,707 B2 | 4/2006 | Aisa | |
| 7,058,524 B2 | 6/2006 | Hayes et al. | |
| 7,110,832 B2 | 9/2006 | Ghent | |
| 7,280,893 B2 | 10/2007 | Spool et al. | |
| 7,324,876 B2 | 1/2008 | Ying | |
| 2001/0049846 A1 | 12/2001 | Guzzi et al. | |
| 2002/0019758 A1 | 2/2002 | Scarpelli | |
| 2002/0019802 A1 | 2/2002 | Malme et al. | |
| 2003/0018744 A1* | 1/2003 | Johanson et al. | 709/217 |
| 2003/0036822 A1 | 2/2003 | Davis et al. | |
| 2003/0055776 A1 | 3/2003 | Samuelson | |
| 2003/0168389 A1 | 9/2003 | Astle et al. | |
| 2003/0187550 A1 | 10/2003 | Wilson et al. | |
| 2003/0208852 A1* | 11/2003 | Hardaway et al. | 8/158 |
| 2003/0233201 A1 | 12/2003 | Horst et al. | |
| 2004/0043754 A1 | 3/2004 | Whewell | |
| 2004/0078154 A1 | 4/2004 | Hunter | |
| 2004/0083112 A1 | 4/2004 | Horst | |
| 2004/0133314 A1 | 7/2004 | Ehlers et al. | |
| 2004/0138981 A1* | 7/2004 | Ehlers et al. | 705/36 |
| 2004/0153170 A1 | 8/2004 | Santacatterina et al. | |
| 2004/0235451 A1 | 11/2004 | Whewell et al. | |
| 2005/0086341 A1* | 4/2005 | Enga et al. | 709/224 |
| 2005/0097905 A1* | 5/2005 | Kwon et al. | 62/157 |
| 2005/0116543 A1 | 6/2005 | Merdjan | |
| 2005/0280969 A1 | 12/2005 | Reynolds | |
| 2005/0280970 A1 | 12/2005 | Reynolds | |
| 2006/0060512 A1 | 3/2006 | Astle et al. | |
| 2006/0124759 A1* | 6/2006 | Rossi | F24F 11/0009 236/51 |
| 2007/0061266 A1 | 3/2007 | Moore et al. | |
| 2007/0130278 A1 | 6/2007 | Baek et al. | |
| 2007/0160022 A1* | 7/2007 | McCoy | H04L 12/2803 370/338 |
| 2007/0162158 A1 | 7/2007 | McCoy et al. | |
| 2007/0217341 A1 | 9/2007 | Kawabata et al. | |
| 2008/0136581 A1 | 6/2008 | Heilman et al. | |

FOREIGN PATENT DOCUMENTS

| | | |
|---|---|---|
| EP | 0 620 631 A1 | 10/1994 |
| EP | 0787849 A1 | 8/1997 |
| KR | 10-2002-0052064 A | 7/2002 |
| WO | 02/20893 A1 | 3/2002 |
| WO | 02/27687 A1 | 4/2002 |
| WO | 03/094321 A1 | 11/2003 |
| WO | 2005/070816 A1 | 8/2005 |
| WO | 2006/055295 A1 | 5/2006 |
| WO | 2006/084528 A1 | 8/2006 |
| WO | 2006-135726 A2 | 12/2006 |

OTHER PUBLICATIONS

Asian Electronics Ltd., Glossary, 2003, pp. 1-6.
www.hrm.uh.edu/docs/pdf/Nextel%20Plans.pdf.
Merriam-Webster's Dictionary of Synonyms, 1984, Merriam-Webster, Inc., p. 13.
IBM Technical Disclosure Bulletin, Jan. 1, 1986; vol. 28, pp. 3657-3660.
U.S. Appl. No. 10/460,885, filed Jun. 13, 2003; Total Home Energy Management; first named inventor Gale Richard Horst.
U.S. Appl. No. 10/280,902, filed Oct. 25, 2002; Method and Apparatus for Managing Resources of Utility Provider; first named inventor Gale R. Horst.
U.S. Appl. No. 10/757,891, filed Jan. 15, 2004; A Process for Managing and Curtailing Power Demand of Appliances and Components Thereof, and System Using Such Process; first named inventor Gianpiero Santacatterina.
U.S. Appl. No. 11/733,385, filed Apr. 10, 2007; Energy Management System and Method; first named inventor Gale R. Horst.

* cited by examiner

MESSAGING ARCHITECTURE AND SYSTEM FOR ELECTRONIC MANAGEMENT OF RESOURCES

BACKGROUND OF THE INVENTION

Field of the Invention

The invention relates to networks of information about resources and appliances and more particularly, to a protocol or messaging architecture for managing resources used by an appliance.

Description of the Related Art

Household appliances typically operate on an article using one or more cycles of operation. Most appliances perform the cycles of operation using a resource. A resource comprises a product or good that is in relatively constant and unlimited supply. Common resources include utilities, such as water, electricity, air, gas, chemical additives, ingredients, ice, cooling air, chilled water, flavoring, steam, heat, or hot water. Sometimes a consumable, which comprises a finite supply of at least one product or a perishable good that must be periodically replenished or replaced is mixed with a resource, as for example, when a detergent is mixed with water.

It is known to provide communication between an appliance and a source of information about a resource in order to manage consumption of the resource by the appliance. For example, an in-home water meter provided by a utility company can send signals to an appliance to instruct the appliance to curtail water usage if the amount of water consumed by the appliance has exceeded a predetermined amount. This amount can be determined by the utility company in accordance with water demand in the region. However, the appliance is unable to efficiently manage resource consumption because these signals typically comprise only an "on" or "off" command rather than detailed information that could be used by the appliance to make predictions about future resource consumption and/or other determinations about resource consumption that could be used to increase the efficiency of the appliance.

SUMMARY OF THE INVENTION

According to the invention a messaging architecture is provided for conveying information by electronic messages between a producer of a resource and a consumer of the resource. The messages, singly or in combination, include a first portion representing one or more resource profiles. Each resource profile has one or more points defined by a value associated with a first identifier related to the resource and a value associated with a second identifier related to the resource. The messages also include a second portion representing a function identifier that represents a meaningful context related to the resource profile.

In another aspect the invention provides a system to manage a resources among a producer and consumer, where the producer and the consumer are in two-way communication with each other through electronic messages and the consumer uses the resource in a cycle of operation. The system includes a message architecture wherein the messages, singly or in combination, comprise a first portion representing one or more resource profiles, each resource profile having at least one point defined by a value associated with a first identifier related to the resource and a value associated with a second identifier related to the resource. The messages also include a second portion representing a function identifier that represents a meaningful context related to the at least one resource profile. The system also includes a source of information about the resource. With this system, the source of information can affect the production or consumption of a resource by electronic messages using the message architecture.

A further aspect of the invention is directed to an appliance configured to perform a cycle of operation on a physical article, where the appliance uses at least some of a resource in performing the operation. The appliance includes a controller configured to send and receive messages related to a resource, where the messages include, singly or in combination, a resource profile and at least one function identifier. With this message architecture, the appliance can participate in effective management of the resource based on the messages.

A further aspect of the invention is directed to a namespace for use in managing consumption or production of a resource. The namespace includes a first set of unique identifiers representing a set of resources, each identifier representing a unique resource, and a second set of unique function identifiers representing a context for information about a resource. The namespace can be used in electronic messaging to effectively manage the resource using electronic messages.

DESCRIPTION OF EMBODIMENTS OF THE INVENTION

Figure 1:
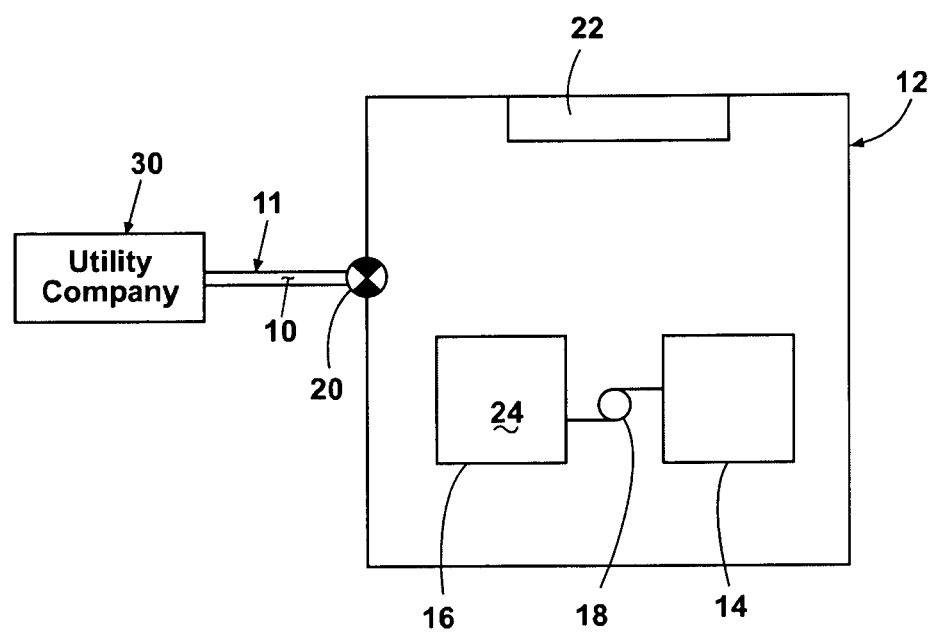
FIG. 1 is a schematic illustration of a system comprising an appliance and incorporating a messaging protocol according to the invention.

By employing a software architecture that enables facile communication among internal components of an appliance and between an external component and one or more of the internal components of the appliance, various components and accessories can communicate with the appliance to expand the capability, functionality, and usability of the appliance. The appliance can be any suitable appliance, such as a household appliance. Examples of household appliances include, but are not limited to, clothes washing machines, clothes dryers, ovens, dishwashers, refrigerators, freezers, microwave ovens, trash compactors, and countertop appliances, such as waffle makers, toasters, blenders, mixers, food processors, coffee makers, and the like.

The appliance can be configured to perform a cycle of operation to complete a physical domestic operation on an article. Examples of the physical domestic operations include a food preparation operation, a food preservation operation, a fluid treatment operation, a cleaning operation, a personal care operation, a fabric treatment operation, an air treatment operation, and a hard surface treatment operation. The air treatment operation can comprise, for example, air purification, air humidification, air dehumidification, air heating, and air cooling. The food preparation operation can comprise, for example, food cleaning, food chopping, food mixing, food heating, food peeling, and food cooling. The food preservation operation can comprise, for example, food cooling, food freezing, and food storage in a specialized atmosphere. The fluid treatment operation can comprise, for example, fluid heating, fluid boiling, fluid cooling, fluid freezing, fluid mixing, fluid whipping, fluid dispensing, fluid filtering, and fluid separation. The cleaning operation can comprise, for example, dishwashing, fabric washing, fabric treatment, fabric drying, hard surface cleaning, hard surface treatment, hard surface drying, carpet cleaning, carpet treatment, and carpet drying. The personal care operation can comprise, for example, hair treatment, nail treatment, body massaging, teeth cleaning, body cleaning, and shaving.

The internal components of the appliances can include any component that participates in the operation of the appliance. Some of the internal components have a corresponding controller (main controller, motor controller, user interface, etc.), which can be a simple microprocessor mounted on a printed circuit board, and other components that have no controller. The components can comprise one or more devices that are controlled by the controller. Typically, the controller components in cooperation either directly or indirectly, through other components, control the operation of all of the components and the associated devices to implement an operation or cycle for the appliance.

The software architecture can be implemented on and communicate over an internal communications network on the appliance. The internal communications network connects the various internal components of the appliance and can be considered a closed network. One example of the internal communications network used within the appliance is the WIDE network protocol, created by Whirlpool, Inc., the assignee of the present patent application.

The software architecture expands the communication ability of the appliance by effectively creating an open network, hereinafter referred to as "network." Within the appliance, the software architecture can, but does not have to, reside on each of the components that have a controller. Those components with the software architecture form a network node that can communicate with the other nodes.

The software architecture can perform multiple functions. For example, one function can relate to identifying each of the components corresponding to a node on the network, while another function can relate to identifying capabilities or functions of the identified components on the network. Yet another exemplary function is to identify the status of the components on the network. In this way, the software architecture can function to inform all of the nodes on the network of the presence, capabilities, and status of the other nodes.

The software architecture can comprise multiple modules, each of which has different functionality. Various combinations of the modules or all of the modules can reside on each of the components. One module having a basic or core functionality resides on all of the components. In one anticipated configuration, all of the modules reside at least on the main controller, which establishes the main controller to function as a primary or main software architecture, with the other nodes functioning in a client relationship to the main software architecture. In such a configuration, all of the nodes can communicate through the main software architecture. The software architecture can be sufficiently robust that it can permit configurations without a main software architecture or with multiple main software architectures. For example, the controllers of the various components can work together to control the operation of the appliance without any one of the appliances functioning as a main controller. Regardless of the configuration, any component with the software architecture can function as a client with respect to the other components.

Because of the software architecture, the internal components of the appliance are not only connected with one another, but the internal components can also be connected to one or more external components or a new internal component through the network. The external component and/or the new internal component has one, some, or all of the software architecture modules in resident. As a result, the external component and/or the new internal component can communicate with the internal components of the appliance and can also communicate with other external components having the software architecture.

The software architecture can be any suitable software architecture that enables communication between the internal components of the appliance and the external component and/or the new internal component or between components external to the appliance. An example of the software architecture is disclosed in International Application No. PCT/US2006/022420, titled "SOFTWARE ARCHITECTURE SYSTEM AND METHOD FOR COMMUNICATION WITH, AND MANAGEMENT OF, AT LEAST ONE COMPONENT WITHIN A HOUSEHOLD APPLIANCE," filed Jun. 8, 2006, published as WO2006135726 on Dec. 21, 2006, and incorporated herein by reference in its entirety. All of the communications between components and accessories and/or any combination of components and accessories described in this application can be implemented by the software and network structures disclosed therein.

The software architecture disclosed in the aforementioned reference can be implemented by providing one or more of the software elements of the software architecture at least on each of the components to be controlled and on the accessory. The software architecture is configured to generate a plurality of messages, with at least one of the software elements residing in each of the components and in the accessory and configured to enable transmission of at least one of the plurality of messages between the components and between the accessory and the components. The messages can be transmitted for bi-directional communication between components and/or components and accessory. The messages can include command messages that are used to implement a physical domestic operation cycle of the appliance.

The messages can be generated by a message generator, which can take the form of the software architecture, the accessory, or a component. One possible message generator is a user interface.

For example, looking at FIG. 1, the software architecture and messaging protocol can be incorporated into a system comprising an appliance 12 according to the invention. The appliance 12 is configured to perform an operation on a physical article, such as clothing or food, using a resource 10 such as water, temperature-controlled air (hot or cold), steam, gas, electricity, and the like. The resource 10 is typically supplied to the appliance 12 by a resource conveyance 11, such as a conduit, wire, inlet and the like. The appliance 12 can comprise a process control apparatus 14 configured to implement and control a cycle comprising at least one operation. The process control apparatus 14 can include components such as electronic control boards, wiring and wiring harnesses, power-supplies, sensors which integrate with the electronics as digital or analog inputs, and actuators like valves, relays, heaters, and the like, all of which integrate with the electronics as digital or analog outputs.

The appliance 12 might have a consumable holder 16 containing a consumable 24 for use during the cycle of operation. The appliance can further comprise an interface 18 between the consumable holder 16 and the process control apparatus 14, and any number of coupling points, one of which 20 couples the resource conveyance 11 to the appliance 12. In other embodiments, the consumable holder 16 can comprise the interface 18, or both the appliance 12 and the consumable holder 16 can comprise mateable or engageable interfaces 18. The interface 18 can be an internal or external interface and can be configured to receive, connect to, or otherwise couple the consumable holder 16 and the appliance 12. The interface 18 can comprise any number of coupling points 20. Coupling points 20 can also be included on the appliance 12 separately from the interface 18. The coupling points 20 are configured to enable the coupling together of various devices and/or sources. In the embodiment illustrated in FIG. 1, coupling point 20 comprises a conventional valve configured to selectively supply a resource 10 from the resource holder 11 to the appliance 12. The process control apparatus 14 is configured to control operation of the coupling point 20.

The appliance 12 can further comprise additional elements commonly included in appliances 12, such as a user interface 22. The user interface 22 is configured for communication with the user. The user interface 22 can comprises a clock or time display. The user interface 22 can be a liquid crystal display (LCD), a plasma display, a digital display, or any other suitable device. The user interface 22 can communicate to the user a status of the appliance, such as via one or more notification icons. Examples of an appliance status include, but are not limited to, laundry washing complete, laundry drying complete, laundry off balance, microwave food defrosted, turn defrosting food in microwave, microwave food ready, oven pre-heat complete, oven food ready, boil over on cooktop, fire, hot water ready, and coffee ready. The relevant notification icons can become illuminated, such as by flashing or being constantly illuminated or otherwise visible when appropriate and become un-illuminated or otherwise not visible when appropriate. The user interface 22 can comprise appliance control capability whereby the user can provide control inputs or commands to the appliance 12 through the user interface 22. Exemplary commands include, but are not limited to, start/stop wash cycle, start/stop drying cycle, start/stop cooking program, decrease heating element power for simmer, execute low heat tumble following drying cycle, decrease microwave heating power, increase temperature of chill zone in refrigerator, and the like.

An appliance 12 performing a cycle of operation on an article will often use at least one consumable 24 during the cycle. A consumable 24 for purposes of the invention includes anything that would be consumed by an appliance 12 during a cycle of operation, such as a substance or device that is used up and must be replenished for subsequent cycles of operation. A consumable 24 can comprise a quantity of a resource 10 that must be periodically replenished. A consumable 24 also includes anything that would be consumed by a person, such as food, cosmetics, or medicine.

For a washer it might be a detergent and/or a softener. For a dryer it might be an anti-static cloth. For a cooking or refrigeration appliance, the consumable may actually be the article on which the appliance performs its cycle of operation, as in the case of food, later to be consumed by a person.

The appliance control apparatus 14 will normally determine the detailed instructions for the cycle of operation from information provided with or regarding the resource 10, the consumable 24, user inputs via the user interface 22, and/or machine sensor data. Consumables 24 here are to be distinguished from resources 10, although resources 10 can be "consumed" during a cycle of operation. Resources 10 are typically constantly supplied, normally from an outside supplier, such as a utility company 30, to an appliance. Examples of resources 10 include the aforementioned water, temperature-controlled air (hot or cold), steam, gas, electricity, and the like. Thus, water supply lines, air conduits, gas lines, and wiring are considered resource holders 11. In a refrigerator, for example, water supplied to the appliance 12 can be considered a resource 10. If flavoring is mixed with the water supplied to the appliance 12, the flavoring can be considered to be a consumable 24, and whatever carries the flavoring to be the consumable holder 16.

More specific examples of the use of a consumable 24 in appliances 12 include dispensing additives for laundry washers, dryers, or combination washer/dryer appliances. The additives can include, but are not limited to, normal detergents, gentle detergents, dark clothing detergents, cold water detergents, fabric softeners, chlorine bleaches, color-safe bleaches, and fabric enhancement chemistry. Non-limiting examples of fabric enhancers are additives to provide stain resistance, wrinkle resistance, water repellency, insect repellency, color fastness, fragrances, and anti-microbials.

The dispensers may be either single load and dispense the entire additive placed in the dispenser. But they may also be bulk dispensers which hold more than a single load. In that case the appliance would meter out and dispense the correct amount of additive for that particular load, and notify the user of how much is remaining. Because these consumables come in different concentrations, the amount needed for a load will vary depending on the concentration, which would be provided with the consumable. The amount needed will also depend on the amount and type of laundry being treated, as well as the condition of the laundry (e.g. soil and stain level). The amount, type, and condition of the laundry will have to be supplied by the user and/or be obtained from appliance sensor information, or otherwise calculated from appliance data. For a laundry application, the additive will have to be dispensed at the right time (before, during, or after wash, rinse, spin, or drying), and sometimes under the right conditions (water or air temperature). This information would be provided with the consumable.

The consumable holder 16, therefore, comprises a device that than holds or contains a consumable 24. Typically the consumable 24 is contained by a receptacle of some sort, such as a container, a dispenser, a cartridge, a dish, a bag, a carton, a conduit, or the like. In some cases, consumable holders 16 can be nested within other consumable holders 16. For example, a cartridge holding a consumable can be disposed in a dispenser, which is another consumable holder 16. In some cases articles on which the appliance operates—such as clothes, dishes, and food stuffs—may not be contained by receptacles, but can perform at least some of the inventive functionalities of a consumable 24 and/or consumable holder 16 and can therefore be considered a consumable 24 and/or consumable holder 16. An example of an article with consumable holder 16 capabilities is a shirt having a bar code thereon containing information that is directly readable by an appliance 12. The appliance 12 can use data and/or information contained by the bar code for use in configuring and selecting the cycle of operation of the appliance. The bar code can be read by the appliance 12 while the shirt is being operated on contemporaneous with the cycle of operation.

Figure 2:
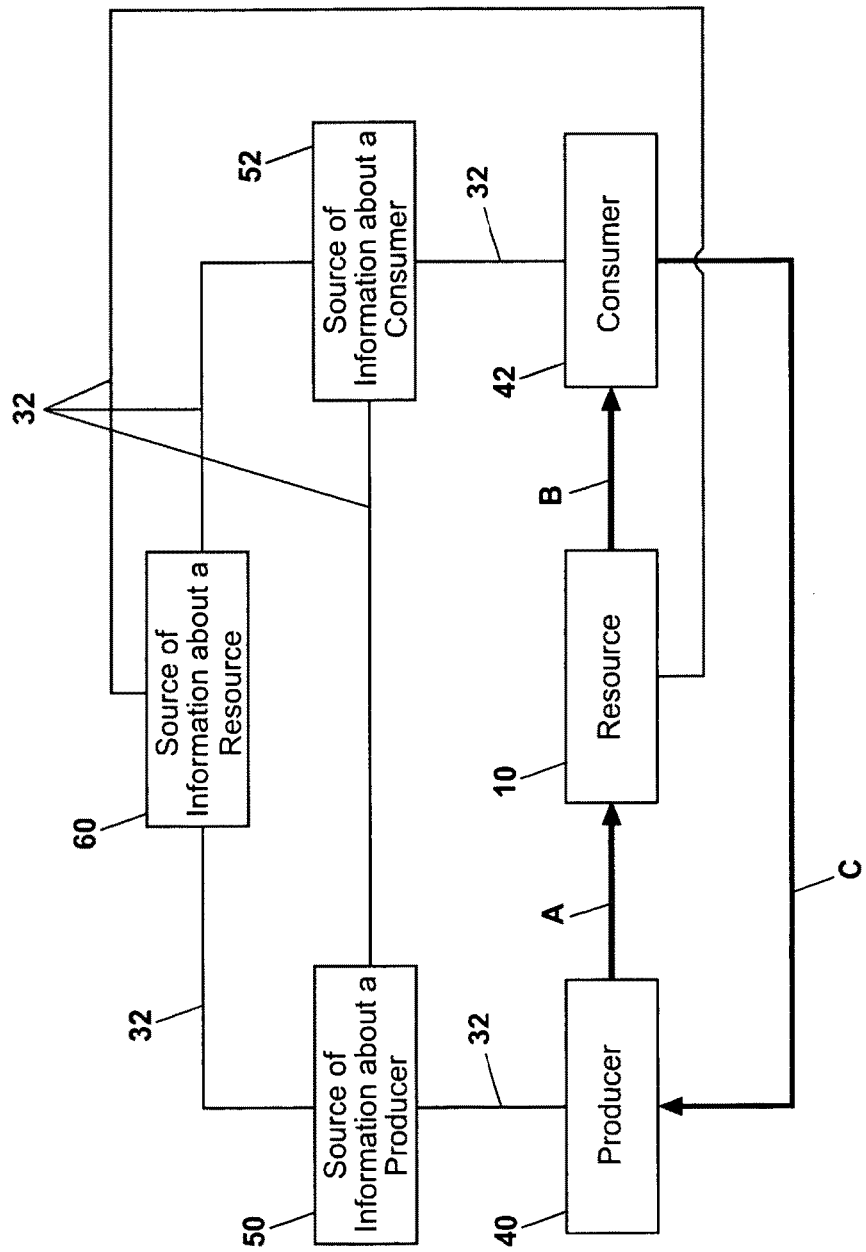
FIG. 2 is a schematic illustration of a network comprising a consumer and a producer according to the invention.

As shown in FIG. 2, a producer of a resource 40, the resource 10, and a consumer of the resource 42 will interact as discussed above. The relationships among the producer 40, the resource 10, and the consumer 42 are illustrated by the arrows A, B, and C in FIG. 2. The producer 40 produces the resource 10 as at A, and a consumer 42 consumes the resource 10 as at B. In some circumstances as, for example, when a consumer agrees to forfeit future consumption, a consumer 42 may actually be a producer 40 as at C. Resource 10 in the context of this invention is considered to include any matter or energy used or consumed by a consumer. Consequently, in some cases a resource may also be considered a consumable. Information about a respective producer, resource and consumer can reside in sources 50, 52, 60 that can be networked, directly or indirectly, and can function as nodes on a network 32. And the producer 40 and consumer 42 can be networked with their respective sources 50, 53. Alternatively, the producer and consumer can actually be their respective sources 50, 53. And in either case, the producer and consumer may be a source of information about a resource, 60 The nodes can be coupled to the network 32 in a wired or wireless manner, such as by Bluetooth, coaxial cable, power lines, USB connection, optical coupling points, or any other suitable means. In certain cases, the consumer 42 can act as a producer. For example, if a consumer 42 agrees to forfeit a given amount of future consumption of the resource 10, then the consumer 42 can effectively "produce" the given amount of the resource 10 (see the arrow C). The producer can be a utility company 30 or any other entity or device that can produce or provide a resource 10. The consumer can be an appliance 12 or any other entity or device that consumes or uses a resource 10. If the consumer is the appliance 12, the process control apparatus 14 of the appliance 12 can be communicatively coupled to the network 32 and can also function as a node. In another embodiment, the appliance 12 can contain both a producer 40 and a consumer 42. For example, a producer 40 could be a consumable holder such as a detergent dispenser in a washing machine, and the consumer 42 could be the process control apparatus of the washing machine that uses the detergent for a cycle of operation. In this case, the producer and consumer are sub-components of a system working together for proper dispensing of the detergent. The detergent can be considered the resource from the "producer" perspective that it is consumed by the consumer over time.

The sources 50, 52 can also be communicatively coupled to each other. The source of information about the producer 50 is configured to communicate information associated with the producer 40 or the resource it produces across the network 32. An example of a source of information about the producer 50 includes a meter configured for communication by electronic messages. Another example includes a water heater configured to communicate information about the production of hot water by electronic messages. The source of information about the consumer 52 is configured to communicate information associated with the consumer 42 or the resource it consumes across the network 32. The source of information about the producer 50 and the source of information about the consumer 52 can be integral with the producer 40 and consumer 42, respectively. Alternatively, and as illustrated in FIG. 2, the source of information about the producer 50 and the source of information about the consumer 52 can be separate devices communicatively coupled to the producer 40 and to the consumer 42, respectively, across the network 32, or by any other suitable means. The sources 50, 52 can be configured for one-way or two-way communication with the producer 40 and consumer 42, respectively.

Similarly, a source of information about a resource 60 can be connected to the network 32 and can function as a node on the network. The source of information about the resource 60 can be communicatively coupled to the source 60 can be communicatively coupled to all of the other elements on the network 32, including the producer 40, the consumer, 42, and the sources 50, 52. The source 60 is configured to communicate information associated with the resource 10 across the network 32. The source of information about the resource 60 can be integral with the resource 10. Alternatively, and as illustrated in FIG. 2, the source of information about the resource 60 can be a separate device communicatively coupled to the resource 10 across the network 32 or by any other suitable means. The source 60 can be configured for one-way or two-way communication with the resource 10.

The source about the resource 60 uses information supplied by and gathered from the sources 50, 52 to make determinations about the supply and demand of the resource 10. Likewise, the source 50, 52 use information supplied by and gathered from the source 60 to make determination about the supply and demand of the resource 10. For example, the source 60 can query the sources 50, 52 regarding consumption and production levels. Based on these levels, the source can determine an amount of the resource 10 available at any given time. Any or all of the sources 50, 52, 60 can comprise memory for storing historical records associated with the system. The sources 50, 52, 60 can further comprise microprocessors or circuit boards for analyzing stored and retrieved data and information.

Figure 2A:
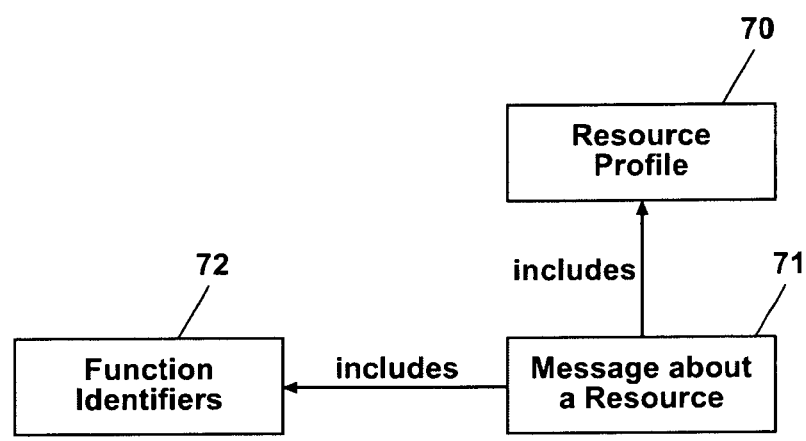

In accord with the invention, all or at least some of the nodes on the network 32 communicate with one another using a specialized messaging protocol comprising a messaging architecture. A protocol is a standard procedure for regulating data transmission between devices; however, not all devices necessarily communicate in the same protocol. A bridge can be used to communicatively couple the nodes to the network 32, if necessary. A bridge effectively translates one protocol into another so that devices with different protocols can communicate with one another. Other kinds of bridges couple networks of the same type using the same protocol but are not physically connected. Network 32 represents a simple network without any bridges or a complex network with an arbitrary number of bridges providing coupling between networks within the complex network. It will be understood that a more complex network can include two sources of information about a resource, each source being in communication with the other. Thus, for example, a consumer in one network can request and obtain relevant production data from a completely different network by way of the communications between the two sources of information about the resources. According to the invention, as shown in FIG. 2A, the message structure 71 of a message about a resource includes a first portion representing at least one resource profile 70, and a second portion representing a function identifier 72.

Figure 3:
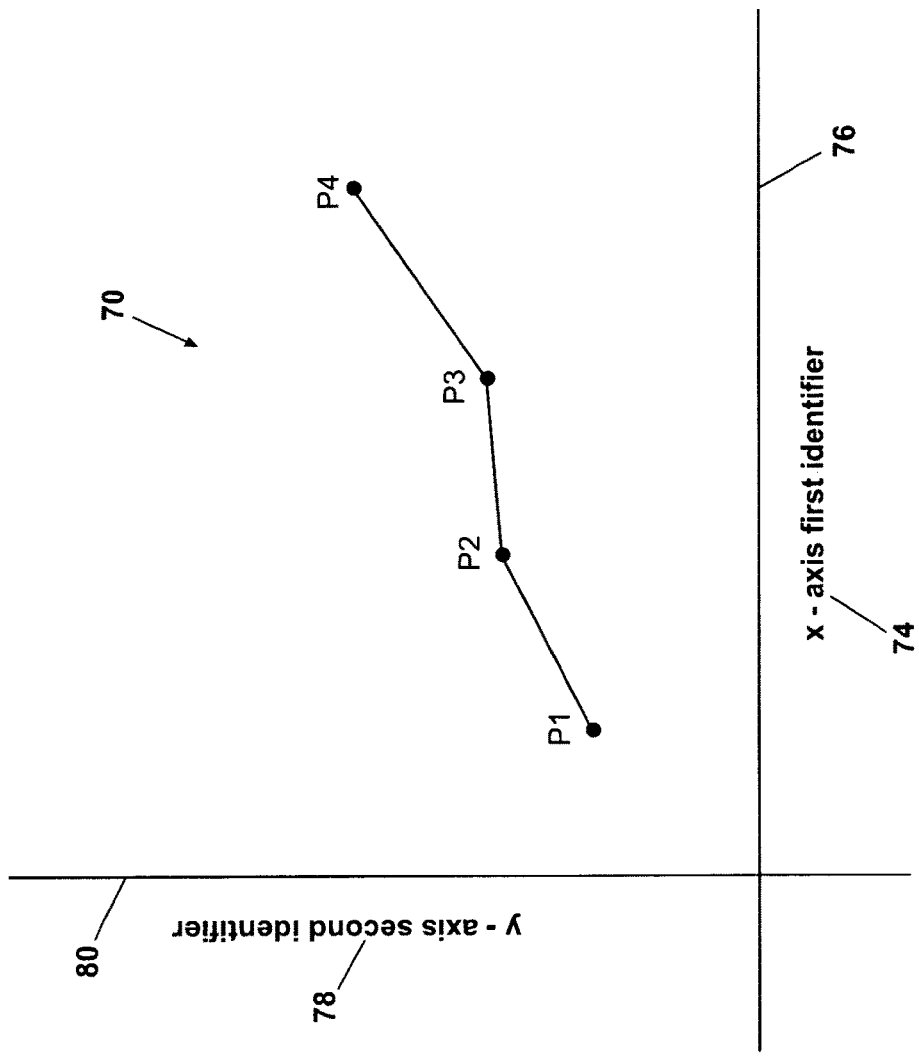
FIG. 3 is a graphical illustration of a resource profile according to the invention.

Referring to FIG. 3, a resource profile 70 is a data structure comprising at least one point of an ordered collection of points where each point is defined by two values and each value corresponds to a variable related in some way to the resource. It can be graphically represented with a labeled x-axis, a labeled y-axis, and an ordered collection of points $P_N$, such as P1-P4 corresponding to pairs of x-axis and y-axis values. P1 is the first point in the ordered collection and is defined by a first value associated with the x-axis and a second value associated with the y-axis. Each axis has an identifier 74, 78, respectively, that is related in some way to the resource and provides meaning to each axis. Thus, a first identifier 74 of the resource profile 70 is associated with the x-axis 76, and a second identifier 78 of the resource profile is associated with the y-axis 80. The first and second identifiers 74, 78 represent parameters of the resource or other related meanings associated with each axis. For example, the first identifier 74 can identify the units of the x-axis as being such things as time in minutes or seconds, cost in dollars, and the like that might relate to the usage of a resource. The second identifier 78 can identify the units of the y-axis as being amounts of the resource such as water, hot air, electricity, grey water, waste heat, bleach and the like, or other types of variables 78 related to resource. To find the value of the y-axis variable, a line perpendicular to the y-axis can be drawn such that it intersects P1 and the y-axis. The value of the y-axis variable is then the value of y where the line intersects the y-axis. Similarly, the value of the x-axis variable can be determined by drawing a second line perpendicular to the x-axis intersecting P1 and the x-axis. The value of the x-axis variable is then the value of x where the second line intersects the x-axis. Thus, for example, each point of the ordered collection of points P1-P4 can represent an amount of power (in kilowatts), and a length of time (in minutes). The ordered collection of points P1-P4 can be stored, retrieved, and interpreted such that each point has a known ordinal relation to every other point. Thus, for example, the resource profile 70 can provide information about the past, present, or future usage of the resource. The resource profile 70 can comprise information associated with the producer 40, the consumer 42, and/or the resource 10. In other embodiments, the first and second identifiers 74, 78 can be incorporated directly into the ordered collection of points.

The message structure 71 of a message about a resource can have a third portion comprising information about the network 32 (not shown in FIG. 2A), such as routing information (including a destination address on the network) that enables communication among nodes. As well, the messaging architecture can include other identifiers of a producer, a consumer, a source of information about a producer, a source of information about a consumer, and/or a source of information about a resource. As such, a namespace can be constructed comprising the other identifiers so that messaging can be directed to nodes of a respective producer, consumer, source of information about a producer, source of information about a consumer, and/or source of information about a resource. By "namespace", we mean a set of names in a naming system where things represented by the names can have unique identities.

The function identifier 72 of the second portion of the message structure 71 of a message about a resource 71 designates the meaning or context of the resource profile 70. For example, the resource profile 70 can be sent as a produce request, a consume request, a do not consume request, a do not produce request, a consumption history, a predicted consumption, a production history, or a predicted production, each of which is associated with a function identifier 72. Additionally, because messages can be sent by any node in the system, any node in the system can also send requests. Requests for production can be sent to a producer 40 from a consumer 42. Likewise, a first producer may request additional production from a second producer in order to meet the overall consumption requirement. It is contemplated that there are many combinations of messages transactions in the effort to automatically manage resources using the message architecture.

A message structure 71 with a function identifier 72 for a produce request can comprise a resource profile 70 being sent to the producer 40 requesting the producer 40 to produce the resource 10 according to the resource profile 70 (e.g., produce 5000 kW Monday, 7000 kW Tuesday, and 3000 kW Wednesday). A message structure 71 with a function identifier 72 for a consume request is similar to a message structure with a function identifier for a produce request, except a consume request comprises a resource profile 70 being sent to the consumer 42 requesting that the consumer 42 consumes an amount of the resource 10 according to the resource profile 10. Likewise a message structure 71 with a function identifier 72 for an increase in production request would contain a resource profile representing an amount of incremental production to the current production wherein the y-axis could be specified in percentages or in absolute units of the resource like gallons and the x-axis could be specified using an identifier representing time in either absolute units like hours of a 24 hours clock or a delta time from a known time such as 4 hours from 6:00 AM. Other messages can be responses to requests. For example, as in FIG. 4, a consumer may receive a first message for reducing consumption by an amount over time defined by a first resource profile, the consumer may respond with a second message having a second resource profile wherein the second resource profile represents the consumption of the resource over time that the consumer is now committing to in response to the first message with the first resource profile. The example, therefore, shows how the messaging architecture enables a producer and a consumer to negotiate in an iterative fashion until a mutual determination of production and or consumption is reached thereby illustrating a message architecture enabling an electronic message based process of negotiation including initiating a negotiation, performing negotiation which includes proposals and counter-proposals in an iterative fashion, concluding negotiation which includes a mutual determination between the negotiators in response to the iterations, and then acting on the determination such that each negotiator can act in cooperation with the other negotiators in accordance with the determination.

Messages having function identifiers 72 for "do not produce" or "do not consume" requests request that the producer 40 and consumer 42, respectively, prohibit or limit production and consumption according to the resource profile 70. Do not produce and do not consume requests can comprise reduce requests, which request that production or consumption is reduced according to the resource profile 70.

A production or consumption history function identifier 72 indicates that the resource profile 70 comprises a historical account of the production or consumption of a resource according to the first and second identifiers in the resource profile. For example, a production history can comprises a set of points P1-Pn indicating the amount of power generated over n days. Similarly, predicted production and predicted consumption function identifiers 72 indicate that the resource profile 70 being communicated represents the predicting future behavior of the resource 10. Predicted production and predicted consumption resource profiles 70 can be generated by referencing production history and consumption history resource profiles 70.

Resource profiles 70 can also be sent in response to a request. For example, upon receipt of a do not produce request message, a producer 40 or consumer 42 can respond by sending or publishing a resource profile 70. If the responsive resource profile 70 is identical to the resource profile 70 included in the do not produce request message, then the receiving party has agreed to adjust production or consumption levels according to the request. If the responsive resource profile 70 is not identical to the resource profile 70 included in the do not produce request message, then the receiving party is unable or unwilling to adjust production or consumption levels according to the request. This responsive behavior enables the sending party to recognize that the producer 40 or consumer 42 has received the request and will or will not adjust its behavior accordingly. The aforementioned responsive behavior exemplifies the aforementioned iterative process of negotiation of production and consumption using electronic messages with resource profiles 70 and function identifiers 72.

Figure 4:
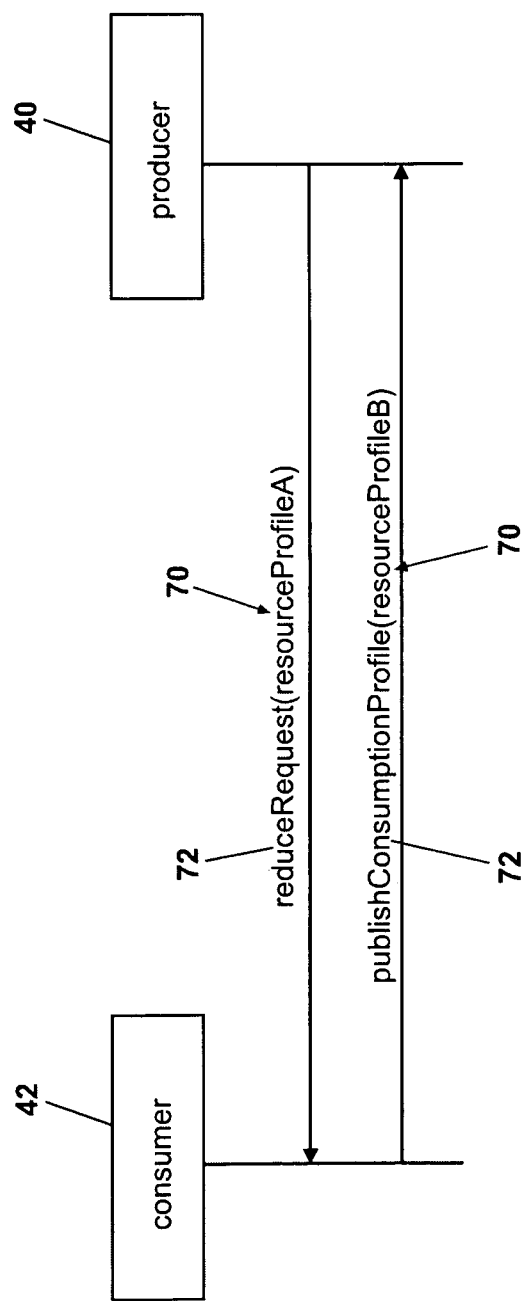
FIG. 4 is a schematic illustration of message exchange comprising information about the resource profile of FIG. 3.

For example, in an exemplary message exchange according to the messaging architecture and illustrated in FIG. 4, the producer 40 sends a reduce request to the consumer 42 requesting that the consumer reduces its consumption levels to the levels indicated in resource profile A, which comprises a desired consumption profile. In this instance, the consumer 42 accepts the request and alters its future consumption profile accordingly. The consumer 42 then sends a message to the producer 40 publishing the altered consumption profile, resource profile B. Once the producer 40 receives the published resource profile B, the producer 40 recognizes that the request has been accepted either in full or in part.

The invention contemplates, for example, a producer 40 that may be in communication with a plurality of consumers where the plurality of response messages may be aggregated according to the identifiers that identify the axes such that an aggregate consumption profile can be constructed by the producer. If the aggregate consumption profile cannot be met by a known production profile, the producer 40 can used additional messaging according to the messaging architecture to further drive the aggregate consumption profile and/or a new production profile to a desired shape. A production profile is a resource profile associated with the production of the resource. In one embodiment, the association can be accomplished by a function identifier 72 providing a production context. Conversely, a consumption profile is a resource profile associated with the consumption or use of the resource.

Looking again at FIG. 1, the inventive messaging structure 71 and architecture can also be used by the consumable holder 16, which can also function as a node on the appliance network 32. The messaging structure can be used by the process control apparatus 14 to manage consumption of the consumable 24. In this example, the consumable holder would be considered a producer of a resource and the process control apparatus 14 could be considered the consumer of a resource. If the appliance were a washer, the resource might be a detergent.

In this or another embodiment where the appliance is part of an appliance network having more than one appliance in communication with each other, the messages communicated between components of an appliance or between appliances can include a production profile generated by an appliance in response to one or more cycles of operation.

The production profile can be associated with a resource by product of the cycles of operation. For example, the by product can be such things as waste heat, grey water, hot water, warm water, water, potable water, steam, humidity, and/or conditioned air.

It will be apparent that the messaging structure 71 takes advantage of a namespace for defining a resource profile used in managing consumption or production of a resource. The namespace includes a universe of unique identifiers, each of which represents a parameter about a resource such as gallons, time, dollars, BTU's, watts, and the like. Another universe of identifiers 72 represents the universe of functions such as reduceRequest, produceRequest, publishConsumptionProfile, and publishProductionProfile, and the like that can be associated with a resource profile 70.

Referring now to FIGS. 5A-5E, a number of message packets are shown that illustrate an exemplary namespace or message structure 100 according to the invention. In the following discussion, it will be understood that the values for what are explained as "identifiers" will ordinarily, but not necessarily be expressed in the packet in some numeric format such as binary as opposed to the text or string-meaningful representation as might be implied by the drawings. It should be understood, that the text or string representation shown are shown for clarity and readability and do not reflect the actual values that would be sent in the packet in this embodiment. In other words, identifiers are the numeric values sent in the packet structures according to descriptions for the contents of the bytes in the following paragraphs. However, for purposes of clarity and readability, identifiers are described in terms of the text or string-meaningful representations. For example, "time" is used as an identifier in Byte 5 of FIG. 5C. However the literal string 'time' would ordinarily not be in Byte 5. Rather a numeric identifier representing 'time' would be in Byte 5 in this example. It is possible to send strings in packet format, but since each character in a string requires one byte in the packet, numeric identifiers for the meaningful data are typically used as a mechanism to save network bandwidth, computer memory, and processing time.

Figure 5A:
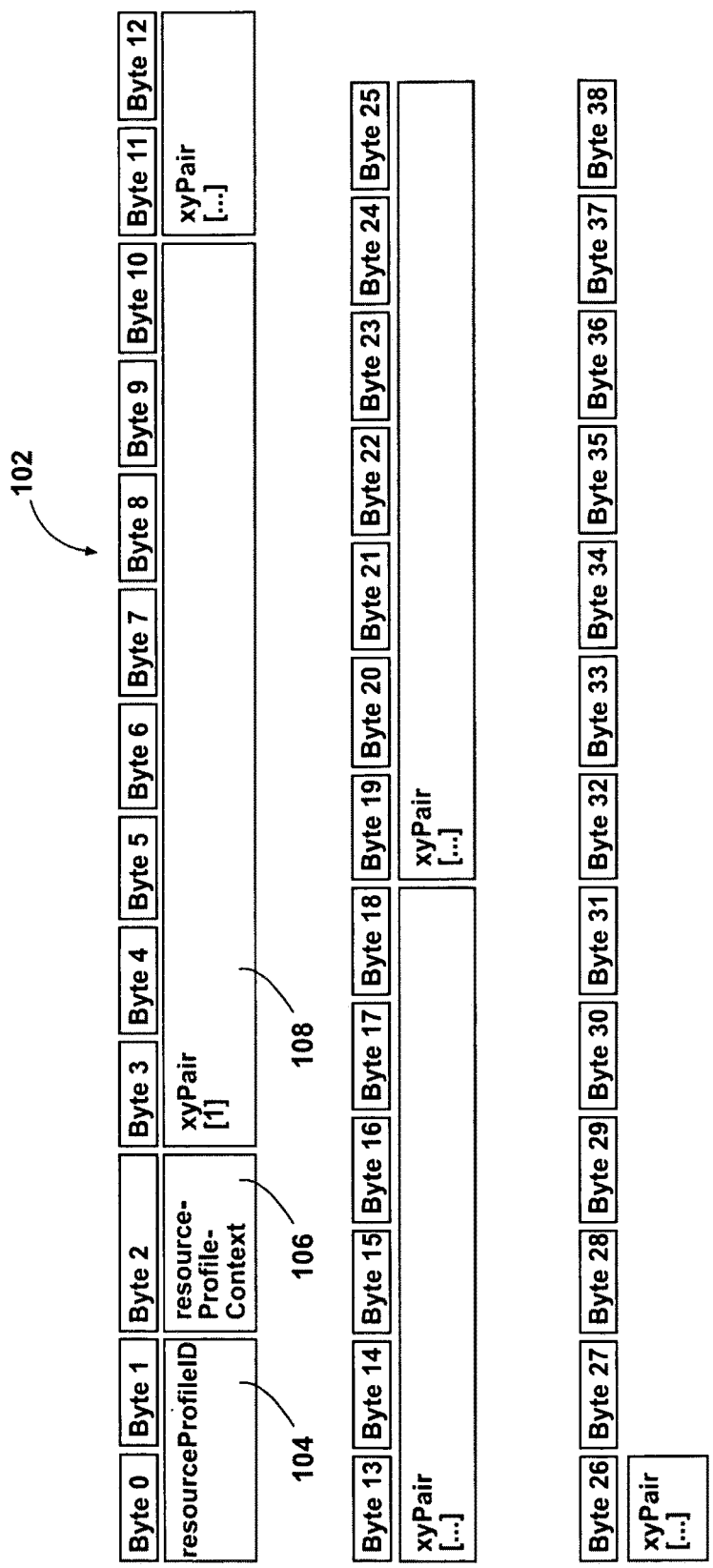
FIG. 5A shows one embodiment of a message packet in a message structure according to the invention.

FIG. 5A is a packet structure 102 that can be used in a command sent from resource producers to resource consumers or from resource consumers to resource producers as a request to adapt production or consumption. It can also be used in a Publish Profile event either as a stand alone message from a resource producer or a resource consumer to notify others of a change or update to a resource profile, or responsive to a Get Profile command that requests such information of resource producers or resource consumers. The packet structure 102 comprises a resource profile identifier 104 in bytes 0 and 1, and a resource profile context identifier 106 in byte 2.

The resource profile identifier 104 identifies a collection of definitions defining the meaning of the data for an X-Y axis. Data for an X-Y axis is typically expressed as an ordered collection of X, Y coordinate pairs 108 and succeeding pairs starting at Byte 11, 19, and 26. Definitions defining the meaning of the data for an X-Y axis include meaning, units, resolution, direction, and span. Meaning refers to meaning of the data on the axis such as time, watts, liters, etc. Units further define meaning by associating known measurements with the meaning of the axis so that an axis can express a precise quantity of something. Resolution is the level of granularity of the values of the data represented on the axis. Resolution is the smallest incremental value or smallest value of change that can be expressed for the data on the axis. Span is the range of values between the maximum value and the minimum value of the data on the axis. Direction provides additional context of the data for the X-Y axis specifying the data as absolute, incrementally more, or incrementally less. The resource profile identifier 104 is an identifier representing the definitions defining the meaning of the data for an X-Y axis. The data must only be used in concert and with full knowledge and understanding of the definitions for proper use and interpretation of the data; otherwise, for example, a producer may produce gallons even though the consumer only requested ounces.

The resource profile context identifier 106 gives additional meaning and/or purpose to the resource profile identifier 104. In other words, a given ordered collection of X-Y data points plotted across a defined X-Y axis is a curve with a defined meaning. The resource profile context identifier 106 provides an additional identifier for the curve so that the data of the curve can be used or interpreted and acted on. Examples of resource profile context identifiers 106 are consumption requests, production requests, consumption forecasts and the like. In one example, a consumer might send a producer a request to produce. In another example a dishwasher might send a hot water heater a production request for hot water for the given cycle of operation of the dishwasher. "Producerequest" may be the resource profile context identifier 106 in these examples. In another example, a producer may notify registered listeners with updated resource profiles expressing new production plans. This could be used, for example, for one electrical generating plant to inform other plants that new generators were being put on line. "ProductionPlan" may be the resource profile context identifier 106 in these examples. Another example could be in the electrical industry where sometime loads are turned on to improve power factor. "ConsumeRequest" could be the resource profile context identifier 106 to turn on a given load in Watts wherein the magnitude of the requested consumption watts could be varied over time according to the ordered collection of coordinate X-Y pairs. In another example, an appliance user may change the normal cycle of a dishwasher to a soak and scour. Upon change, the dishwasher could notify registered users or could send a broadcast message of a new 'water' consumption resource profile using "consumptionPlan" as a resource profile context identifier 106.

The remaining bytes contain XY pairs 108, comprising an ordered collection of x-y coordinates where the first 4 bytes are the X value and last 4 bytes are the y value. The MSbit of the X value 4 bytes is a sign bit where a 0 means positive and a 1 means negative. The remaining 3 bytes and 7 bits are data. The format of the 4 bytes for the y value is the same as the X with the MSbit of the Y value 4 bytes also being a sign bit.

Referring now also to FIGS. 2A and 4, the resource profile identifier 104 and the XY pairs 108 together may be considered a resource profile 70. The resource profile context identifier 106 may be considered a function identifier 72.

Figure 5B:
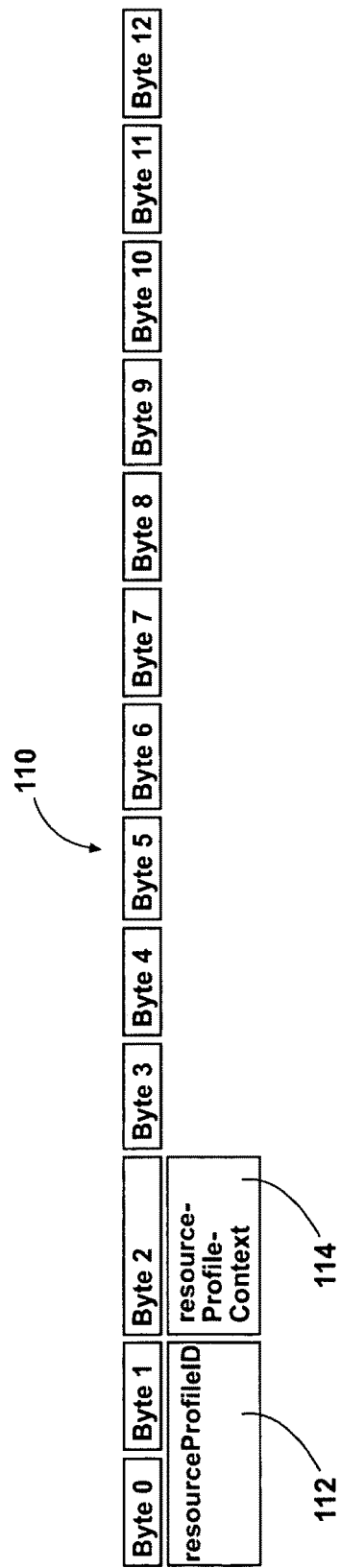
FIG. 5B shows another embodiment of a message packet in a message structure according to the invention.

FIG. 5B is a packet structure 110 that can be used in a command that will result in a Publish Profile event. It can be seen that it contains a resource profile identifier 112 in bytes 0 and 1, and a resource profile context identifier 114 in byte 3, each having the foregoing definitions of resource profile identifier 104 and resource profile context identifier 106, respectively.

Figure 5C:
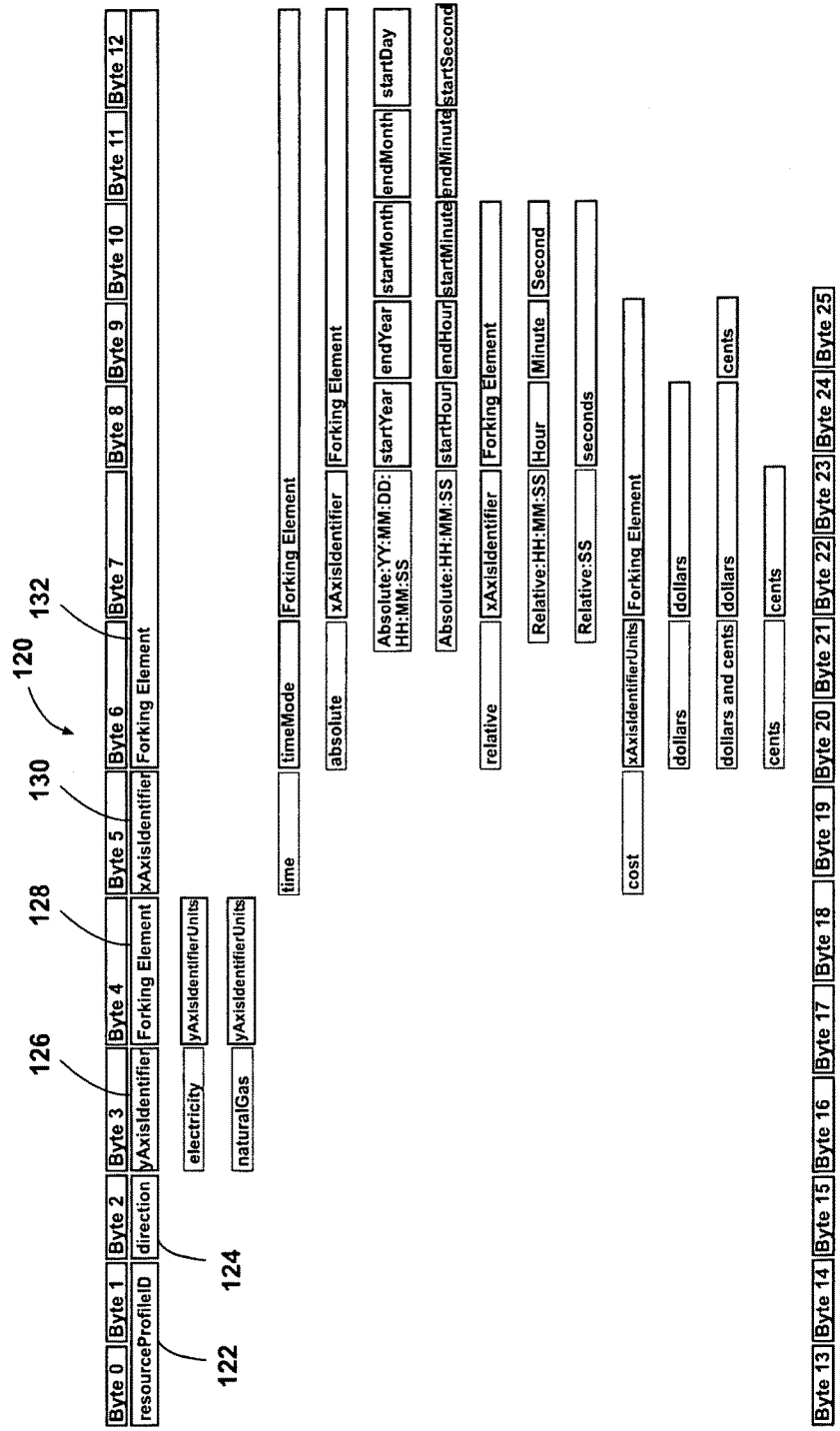
FIG. 5C shows another embodiment of a message packet in a message structure according to the invention.

FIG. 5C is a packet structure 120 that can be used in a command to associate an identifier with a collection of definitions defining the meaning of the data for an XY axis, or actually containing the resource profile data according to the definitions in a response to an appropriate command. A resource profile identifier 122 in bytes 0 and 1 has the same definition as resource profile identifiers 104, 112 above. A direction 124 in byte 2 is a parameter that determines if the request is a request to raise or lower or set the amount of production/consumption to the amount specified by the profile. Valid values might include "increase incrementally", "decrease incrementally", or "set an absolute value."

Byte 3 holds a Y axis identifier 126, shown here, for example, as having a value representing "natural gas" or "electricity." Byte 4 contains a forking element 128 to point to a sub-identifier of byte 3 such as units. For example, an electricity identifier 126 can be in milliwatts, watts, or kilowatts. Similarly, a natural gas identifier 126 can be expressed in liters, cubic inches, or cubic feet.

Byte 5 holds an X axis identifier 130, shown here for example as representing "time" or "cost." Byte 6 contains a forking element 132 to point to a sub-identifier of byte 5. For example, "time" can be expressed in relative or absolute parameters, and "cost" can be expressed in dollars or cents or a combination thereof. As well, a time byte forking element can have further forking elements to provide better definition. Absolute and relative time can be expressed in a number of different ways as shown.

Figure 5D:
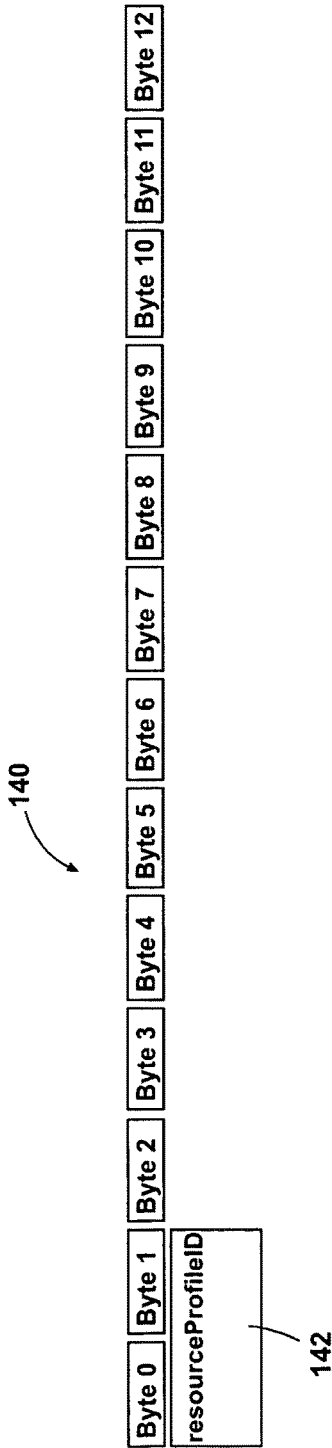
FIG. 5D shows another embodiment of a message packet in a message structure according to the invention.

FIG. 5D is a packet structure 140 that might be used in a command to request the parameters associated with a particular resource profile identifier 142 and result in a message containing the packet structure of FIG. 5C. In such case, the value of the resource profile identifier 122 in the return message of 5C will be the same as the resource profile identifier 142 in the command message of 5D.

Figure 5E:
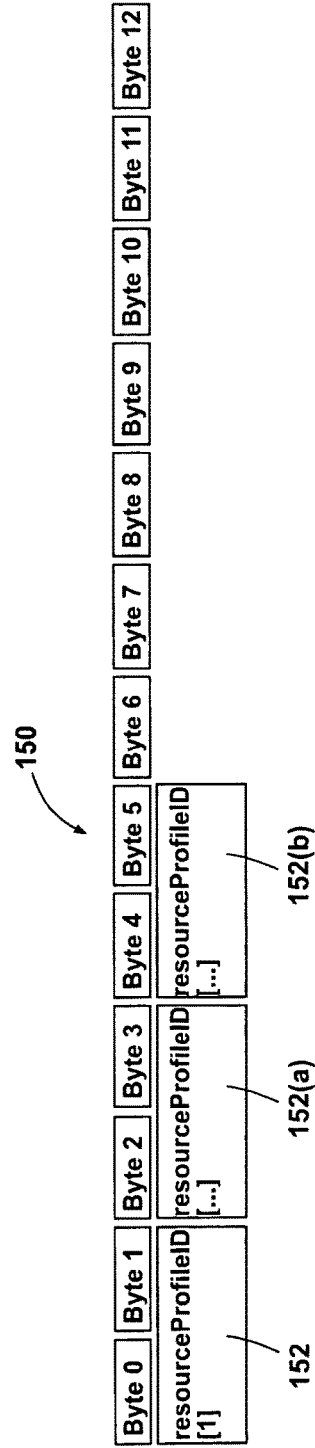
FIG. 5E shows another embodiment of a message packet in a message structure according to the invention.

FIG. 5E is a packet structure 150 that might be used in an event responsive to a command asking for collection of resource profiles, and contains an enumeration of all resource profile identifiers 152, . . . , 152 (n) responsive to the request.

It can be seen that the namespaces defined in the exemplars of FIGS. 5A-5E contain several unique set of identifiers that represent parameters about and resources with enough information to effectively manage the resources entirely via electronic messaging. The namespaces include sets of identifiers representing all meanings of the data for all possible XY axes of all resource profiles, all resources and all resource profile contexts.

Referring again also to FIG. 2, the resource management capabilities provided by the messaging structure 71 of the invention can be used to reduce resource consumption, coordinate the production of resources, or coordinate the usage of resources or consumables by an appliance or the mixing thereof within an appliance or within any system wherein ingredients are aggregated over time. Information from the sources 50, 52, 60 can be used by an appliance 12 on the network 32 to alter operational parameters in accordance with a preferred resource consumption profile, or simply in a manner intended to minimize waste and increase operational efficiency. Information about the appliance 12 operation made available by the messaging architecture can be displayed at the user interface 22 so that a user can select operational parameters best suited for the appliance 12 and system. In addition, the appliance 12 can be configured to automatically modify a cycle of operations based on information made available by the messaging architecture.

While the invention has been specifically described in connection with certain specific embodiments thereof, it is to be understood that this is by way of illustration and not of limitation, and the scope of the appended claims should be construed as broadly as the prior art will permit.

What is claimed is:

1. A messaging architecture stored in a non-transitory storage medium for conveying information by electronic messages between a producer of a resource and a consumer of the resource, wherein the messaging architecture comprises messages, singly or in combination, having:
   a first portion representing at least one resource profile, each resource profile having an ordered collection of points wherein each point represents a coordinate pair of variables related to at least one of time, cost, and amount regarding use of the resource;
   first and second identifiers representing parameters of the resource and associated with values of each coordinate pair; and
   a second portion representing a function identifier that designates a context of the resource profile;
   whereby the first and second portions provide enough information in the messages to effectively manage the resource.

2. The messaging architecture of claim 1 further comprising identifiers of one of a producer, a consumer, a source of information about a producer, a source of information about a consumer, and a source of information about a resource.

3. The messaging architecture of claim 1 wherein the function identifier comprises one of a produce request, a consume request, a do not consume request, a do not produce request, a consumption history, a predicted consumption, a production history, and a predicted production.

4. The messaging architecture of claim 1 wherein the messages comprise a third portion containing information about a network.

5. The messaging architecture of claim 1 wherein the first portion further comprises a direction.

6. The messaging architecture of claim 1 wherein at least one of the first and second identifiers comprise a units identifier.

7. A system to manage a resource among a producer and consumer, wherein the producer and the consumer are in two-way communication with each other through electronic messages and wherein the consumer uses the resource in a cycle of operation, the system comprising:
   a processor;
   a message architecture stored in a non-transitory storage medium of the producer and the consumer, coupled to the processor, wherein the messaging architecture comprises messages, singly or in combination, having a first portion representing at least one resource profile, each resource profile having at least one point of an ordered collection of points wherein each point represents a coordinate pair of variables related to at least one of time, cost, and amount regarding use of the resource; and
   first and second identifiers representing parameters of the resource and associated with values of each coordinate pair;
   a second portion representing a function identifier that designates a context of the resource profile; and
   a source of information about the resource,
   whereby the source of information can affect production by the producer or consumption by the consumer of a resource by electronic messages using the message architecture.

8. The system according to claim 7 wherein the source of information about a resource aggregates the information from at least one of a producer or consumer.

9. The system according to claim 8 wherein the information includes information from one of a source of information about a producer or a source of information about a consumer.

10. The system according to claim 9 wherein the producer is the source of information about a producer.

11. The system according to claim 9 wherein the consumer is the source of information about a consumer.

12. The system according to claim 9 wherein the source of information about a resource is one of the source of information about a producer and the source of information about a consumer.

13. The system according to claim 7 further comprising a second source of information about the resource and the two sources of information about the resource communicate with each other.

14. The system according to claim 7 further comprising one of a source of information about a producer and a source of information about a consumer, wherein the consumer is an appliance, the source of information about a producer is a meter, and the resource is one of gas, water and electricity.

15. The system according to claim 7 wherein the consumer is an appliance, the producer is a water heater, and the resource is hot water.

16. The system according to claim 7 wherein the producer is an appliance and the resource is one of grey water and waste heat.

17. The system according to claim 7 wherein the consumer is an appliance, the producer is a utility, and the resource is one of gas, water and electricity.

18. The system according to claim 7 wherein the consumer is an appliance.

19. The system according to claim 7 wherein the producer is an appliance by forfeiting future consumption of a resource.

20. The system according to claim 7 wherein the producer and the consumer iteratively negotiate using the electronic messages to agree on one of production and consumption of the resource.

21. An appliance configured to perform a cycle of operation on a physical article, wherein the appliance uses at least some of a resource in performing the operation, the appliance comprising:
   a memory;
   a controller, coupled to the memory, configured to send and receive messages related to a resource, wherein the messages comprise, singly or in combination, a resource profile having at least one point of an ordered collection of points wherein each point represents a coordinate pair of variables related to at least one of time, cost, and amount regarding use of the resource;
   first and second identifiers representing parameters of the resource and associated with values of each coordinate pair; and
   a second portion representing at least one function identifier wherein the function identifier designates a context of the resource profile,
   whereby the appliance can participate in effective management of the resource based on the messages.

22. The appliance according to claim 21 further comprising a user interface whereby a user can input information related to effective management of the resource based on the messages or the user interface can display information about a resource profile and a function identifier.

23. The appliance according to claim 21 further comprising a component that provides a resource and process control apparatus that uses a resource, wherein the messages can be communicated between the component and the process control apparatus to effectively manage the use of the resource within the appliance.

24. The appliance according to claim 23 wherein the appliance is a washer, the component is a dispenser, and the resource is a detergent.

25. The appliance according to claim 21 wherein the messages include a production profile generated by the appliance in response to a cycle of operation.

26. The appliance according to claim 25 wherein the production profile is associated with a resource by product of the cycle of operation.

27. The appliance according to claim 26 wherein the by product is one of waste heat, grey water, hot water, warm water, water, potable water, steam, humidity, and conditioned air.

28. The appliance according to claim 21 wherein the messages include a consumption profile generated by the appliance in response to a cycle of operation.

29. The appliance according to claim 28 wherein the resource is one of water, electricity, air, gas, chemical additives, ingredients, ice, cooling air, chilled water, flavoring, steam, heat, and hot water.

30. The appliance according to claim 21 wherein the controller is configured to affect a cycle of operation in response to a received message.

\* \* \* \* \*